United States Patent
Matsumoto et al.

(10) Patent No.: US 12,344,711 B2
(45) Date of Patent: Jul. 1, 2025

(54) UV-CURABLE SILICONE COMPOSITION FOR STEREOLITHOGRAPHY, CURED PRODUCT THEREOF, AND METHOD FOR PRODUCING CURED PRODUCT

(71) Applicant: Shin-Etsu Chemical Co., Ltd., Tokyo (JP)

(72) Inventors: Nobuaki Matsumoto, Annaka (JP); Taichi Kitagawa, Annaka (JP); Shinji Kimura, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 18/285,929

(22) PCT Filed: Mar. 31, 2022

(86) PCT No.: PCT/JP2022/016471
§ 371 (c)(1),
(2) Date: Oct. 6, 2023

(87) PCT Pub. No.: WO2022/224793
PCT Pub. Date: Oct. 27, 2022

(65) Prior Publication Data
US 2024/0199815 A1    Jun. 20, 2024

(30) Foreign Application Priority Data
Apr. 23, 2021  (JP) .................... 2021-073156

(51) Int. Cl.
| | |
|---|---|
| C08G 77/20 | (2006.01) |
| B29C 64/129 | (2017.01) |
| B33Y 10/00 | (2015.01) |
| B33Y 70/00 | (2020.01) |
| B33Y 80/00 | (2015.01) |
| C08K 5/14 | (2006.01) |

(52) U.S. Cl.
CPC ............ *C08G 77/20* (2013.01); *B29C 64/129* (2017.08); *C08K 5/14* (2013.01); *B33Y 10/00* (2014.12); *B33Y 70/00* (2014.12); *B33Y 80/00* (2014.12)

(58) Field of Classification Search
CPC ..... C08G 77/20; B29C 64/129; B29C 64/314; C08K 5/14; C08F 290/068; C08F 299/08
See application file for complete search history.

(56) References Cited

U.S. PATENT DOCUMENTS

| | | | |
|---|---|---|---|
| 9,464,192 B2 * | 10/2016 | Kimura ................ | H01L 23/296 |
| 2011/0196096 A1 | 8/2011 | Angermaier et al. | |
| 2016/0264796 A1 | 9/2016 | Suzuki et al. | |
| 2018/0188076 A1 | 7/2018 | Backer et al. | |

(Continued)

FOREIGN PATENT DOCUMENTS

| | | |
|---|---|---|
| EP | 3 828 244 A1 | 6/2021 |
| EP | 4 166 585 A1 | 4/2023 |

(Continued)

OTHER PUBLICATIONS

Machine English translation of Iwata et al., JP 2016-190977 (Year: 2016).*

(Continued)

*Primary Examiner* — Jessica M Roswell
(74) *Attorney, Agent, or Firm* — Birch, Stewart, Kolasch & Birch, LLP

(57) ABSTRACT

Provided is a UV-curable silicone composition containing:

(A) an organopolysiloxane having, in one molecule, two groups represented by formula (1)

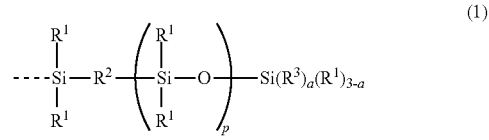

($R^1$ is a monovalent hydrocarbon group, $R^2$ is an oxygen atom or an alkylene group, $R^3$ is an acryloyloxyalkyl group, etc., p represents a number satisfying $0 \leq p \leq 10$, and a represents a number satisfying $1 \leq a \leq 3$);

(B) an organopolysiloxane resin which comprises (a) a unit represented by formula (2)

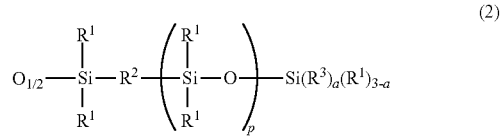

($R^1$ to $R^3$, a and p are the same as above),
(b) a $R^4_3SiO_{1/2}$ unit ($R^4$ represents a monovalent hydrocarbon group), and (c) a $SiO_{4/2}$ unit, and in which a molar ratio of the sum of the unit (a) and the unit (b) and the unit (c) is 0.6 to 1.2:1;

(C) a photopolymerization initiator; and (D) an organic peroxide, wherein the UV-curable silicone composition has a viscosity applicable to a stereolithography such as a laser process, can be shaped even with a small amount of UV irradiation, and forms a cured product exhibiting excellent rubber physical properties.

11 Claims, No Drawings

(56) References Cited

U.S. PATENT DOCUMENTS

| | | |
|---|---|---|
| 2019/0092951 A1 | 3/2019 | Wang et al. |
| 2019/0315981 A1 | 10/2019 | Nishiura |
| 2020/0270481 A1 | 8/2020 | Otake et al. |
| 2020/0277493 A1* | 9/2020 | Sutoh ............ C08K 3/36 |
| 2021/0309782 A1 | 10/2021 | Otake et al. |
| 2022/0002595 A1 | 1/2022 | Otake et al. |
| 2022/0119663 A1 | 4/2022 | Matsumoto et al. |

FOREIGN PATENT DOCUMENTS

| | | | |
|---|---|---|---|
| JP | 4788863 B2 | | 10/2011 |
| JP | 2013-203794 A | | 10/2013 |
| JP | 5384856 B2 | | 1/2014 |
| JP | 5890990 B2 | | 3/2016 |
| JP | 2016-190977 | * 11/2016 | ............ C08F 299/08 |
| JP | 2019-181932 A | | 10/2019 |
| JP | 2020-19910 A | | 2/2020 |
| JP | 6687111 B2 | | 4/2020 |
| JP | 6727290 B2 | | 7/2020 |
| JP | 2020-172103 A | | 10/2020 |
| WO | WO 2019/065398 A1 | | 4/2019 |
| WO | WO 2020/022140 A1 | | 1/2020 |
| WO | WO 2020/080011 A1 | | 4/2020 |
| WO | WO 2020/105365 A1 | | 5/2020 |
| WO | WO 2021/200089 A1 | | 10/2021 |
| WO | WO 2021/250988 A1 | | 12/2021 |

OTHER PUBLICATIONS

Decision to Grant a Patent issued Aug. 1, 2023, in Japanese Patent Application No. 2021-073156.
Office Action issued Jun. 6, 2023, in Japanese Patent Application No. 2021-073156.
International Search Report for PCT/JP2022/016471 (PCT/ISA/210) mailed on Jun. 21, 2022.
Written Opinion of the International Searching Authority for PCT/JP2022/016471 (PCT/ISA/237) mailed on Jun. 21, 2022.
Extended European Search Report for European Application No. 22791568.3, dated Feb. 14, 2025.

* cited by examiner

UV-CURABLE SILICONE COMPOSITION FOR STEREOLITHOGRAPHY, CURED PRODUCT THEREOF, AND METHOD FOR PRODUCING CURED PRODUCT

TECHNICAL FIELD

The present invention relates to an ultraviolet-curable silicone composition for stereolithography, to a cured product thereof, and to a method for producing a cured product.

BACKGROUND ART

Stereolithographic materials which can be used on 3D printers have been under active development in recent years, and materials ranging from metals to resins are now seeing use for this purpose. Examples of such materials in the field of resins include acrylate-type photocurable resin compositions and urethane acrylate-type photocurable resin compositions. However, cured products of these resin compositions are extremely hard and cannot be freely bent (Patent Document 1).

Instances where flexible silicone materials are needed for certain applications have become more common, and silicone materials for 3D printers adapted to the stereolithographic process have already been developed. For example, a composition containing an alkenyl group-containing organopolysiloxane, a mercapto group-containing organopolysiloxane and an MQ resin has already been developed as a material for stereolithography (Patent Document 2). An ultraviolet-activated platinum catalyst-containing silicone composition for dispensing technology has also been proposed (Patent Document 3). Moreover, a thermosetting silicone composition for 3D printers has been proposed (Patent Document 4) as well.

In addition, an ultraviolet-curable low-viscosity silicone material for 3D printers that use an ink jet process has been proposed (Patent Document 5). This material has the advantage that it cures with a short period of ultraviolet irradiation and the fabricating precision also is excellent. However, compared with ordinary silicone materials, there is a problem that the mechanical strength and heat resistance are poor.

An ultraviolet-curable silicone composition has thus been newly developed for stereolithography, the use of which has been rising rapidly in recent years (Patent Document 6).

Unfortunately, there is a problem that with short-duration UV exposure alone, illuminance of the material is inadequate and the mechanical strength does not improve to a sufficient degree.

PRIOR ART DOCUMENTS

Patent Documents

Patent Document 1: JP 5890990
Patent Document 2: JP 4788863
Patent Document 3: JP 5384656
Patent Document 4: JP 6727290
Patent Document 5: JP 6687111
Patent Document 6: JP-A 2020-019910

SUMMARY OF INVENTION

Technical Problem

The present invention has been made in light of the above circumstances. One object of the invention is to provide a UV-curable silicone composition which has a viscosity suitable for use in stereolithographic processes such as laser processing and digital light processing (DLP) and can be shaped even with a small amount of UV irradiation to give a cured product endowed with excellent rubber properties. Another object of the invention is to provide a cured product of such a composition.

Solution to Problem

As a result of intensive investigations aimed at achieving these objects, the inventors have discovered that by adding both a photopolymerization initiator and an organic peroxide to an organopolysiloxane containing specific (meth)acryloyloxy-containing groups and an organopolysiloxane resin containing specific (meth)acryloyloxy-containing groups, a UV-curable silicone composition can be obtained which is suitable for use also in low-exposure dose stereolithography processes and gives a cured product having good rubber properties. This discovery ultimately led to the present invention.

Accordingly, the invention provides the following:

1. An ultraviolet-curable silicone composition for stereolithography which includes:

(A) 100 parts by weight of an organopolysiloxane having two groups of formula (1) below per molecule

[Chem. 1]

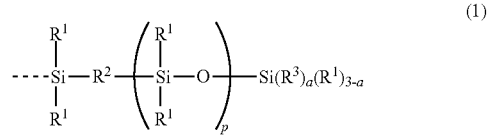

(wherein each $R^1$ is independently a substituted or unsubstituted monovalent hydrocarbon group of 1 to 20 carbon atoms, $R^2$ is an oxygen atom or an alkylene group of 1 to 20 carbon atoms, each $R^3$ is independently an acryloyloxyalkyl group, methacryloyloxyalkyl group, acryloyloxyalkyloxy group or methacryloyloxyalkyloxy group, p is a number that satisfies $0 \le p \le 10$, the letter 'a' is a number that satisfies $1 \le a \le 3$, and the dashed line represents an available bond);

(B) from 5 to 200 parts by weight of an organopolysiloxane resin containing (a) units of formula (2) below

[Chem. 2]

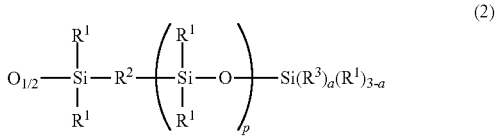

(wherein $R^1$, $R^2$, $R^3$, a and p are as defined above),
   (b) $R^4{}_3SiO_{1/2}$ units (wherein each $R^4$ is independently a substituted or unsubstituted monovalent hydrocarbon group of 1 to 10 carbon atoms) and (c) $SiO_{4/2}$ units, the molar ratio of the sum of (a) units and (b) units to (c) units being from 0.6:1 to 1.2:1;

(C) from 0.01 to 20 parts by weight of a photopolymerization initiator; and (D) from 0.1 to 20 parts by weight of an organic peroxide;

2. The ultraviolet-curable silicone composition for stereolithography of 1 above which has a viscosity at 23° C. of not more than 10,000 mPa·s;
3. The ultraviolet-curable silicone composition for stereolithography of 1 or 2 above, further including (E) from 0.01 to 20 parts by weight of an ultraviolet absorber which absorbs light at wavelengths between 360 and 410 nm per 100 parts by weight of component (A);
4. The ultraviolet-curable silicone composition for stereolithography of any one of 1 to 3 above, further including (F) from 0.01 to 20 parts by weight of a colorant per 100 parts by weight of component (A);
5. A cured product of the ultraviolet-curable silicone composition for stereolithography of any one of 1 to 4 above; and
6. A method for producing the cured product of 5 above, which method includes the steps of irradiating the ultraviolet-curable silicone composition for stereolithography of any one of claims 1 to 4 with from 1 to 200 mJ/cm2 of ultraviolet light, and then curing at between 50° C. and 200° C.

Advantageous Effects of Invention

The ultraviolet-curable silicone composition for stereolithography of the invention has a viscosity suitable for use in stereolithographic processes such as laser and DLP processes, and can be shaped even with a small amount of UV irradiation. The cured product obtained after ultraviolet curing exhibits good rubber properties.

DESCRIPTION OF EMBODIMENTS

The present invention is described in detail below.

The ultraviolet-curable silicone composition for stereolithography according to the invention includes components (A) to (D) below:
(A) an organopolysiloxane having two groups of formula (1) below per molecule,
(B) an organopolysiloxane resin containing (a) units of formula (2) below, (b) $R^4{}_3SiO_{1/2}$ units and (c) $SiO_{4/2}$ units;
(C) a photopolymerization initiator; and
(D) an organic peroxide.

(A) Organopolysiloxane

Component (A) used in the invention is one of the crosslinking ingredients in this composition. It is an organopolysiloxane which has two groups of formula (1) below per molecule and in which the backbone is substantially composed of diorganosiloxane units.

[Chem. 3]

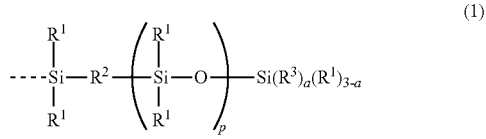

(1)

(wherein the dashed line represents an available bond).

In formula (1), each $R^1$ is independently a substituted or unsubstituted monovalent hydrocarbon group of 1 to 20 carbon atoms, and is preferably a monovalent hydrocarbon group of 1 to 10 carbon atoms, more preferably 1 to 8 carbon atoms, other than an aliphatic unsaturated group.

$R^2$ is an oxygen atom or an alkylene group of 1 to 20 carbon atoms, preferably 1 to 10 carbon atoms, and more preferably 1 to 5 carbon atoms.

Each $R^3$ is independently an acryloyloxyalkyl, methacryloyloxyalkyl, acryloyloxyalkyloxy or methacryloyloxyalkyloxy group.

In formula (1), the monovalent hydrocarbon groups of 1 to 20 carbon atoms serving as the $R^1$ groups may be linear, branched or cyclic, and are exemplified by alkyl, alkenyl, aryl and aralkyl groups.

Specific examples include alkyl groups such as methyl, ethyl, n-propyl, isopropyl, n-butyl, isobutyl, tert-butyl, n-hexyl, cyclohexyl, n-octyl, 2-ethylhexyl and n-decyl groups; alkenyl groups such as vinyl, allyl (2-propenyl), 1-propenyl, isopropenyl and butenyl groups; aryl groups such as phenyl, tolyl, xylyl and naphthyl groups; and aralkyl groups such as benzyl, phenylethyl and phenylpropyl groups.

Some or all of the hydrogen atoms bonded to carbon atoms on these monovalent hydrocarbon groups may be replaced with halogen atoms such as chlorine, fluorine and bromine atoms, or with other substituents such as cyano groups. Specific examples include halogen-substituted hydrocarbon groups such as chloromethyl, bromoethyl and trifluoropropyl groups; and cyano-substituted hydrocarbon groups such as the cyanoethyl group.

Of these, $R^1$ is preferably an alkyl group of 1 to 5 carbon atoms or a phenyl group; and is more preferably a methyl, ethyl or phenyl group.

The alkylene group of 1 to 20 carbon atoms serving as the $R^2$ group may be linear, branched or cyclic. Specific examples include methylene, ethylene, propylene, trimethylene, tetramethylene, isobutylene, pentamethylene, hexamethylene, heptamethylene, octamethylene, nonamethylene and decylene groups.

Of these, $R^2$ is preferably an oxygen atom or a methylene, ethylene or trimethylene group. An oxygen atom or an ethylene group is more preferred.

The number of carbons in the alkyl (alkylene) group within the acryloyloxyalkyl, methacryloyloxyalkyl, acryloyloxyalkyloxy or methacryloyloxyalkyloxy group represented by $R^3$, although not particularly limited, is preferably from 1 to 10, and more preferably from 1 to 5. Specific examples of these alkyl groups include those, among the groups mentioned above as examples of $R^1$, which have from 1 to 10 carbon atoms.

Specific examples of $R^3$ include, but are not limited to, those of the following formulas.

[Chem. 4]

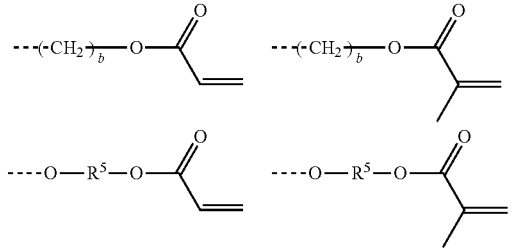

(wherein a dashed line represents an available bond).

In the above formula, "b" is a number which satisfies $1 \leq b \leq 4$, and preferably satisfies $1 \leq b \leq 3$.

$R^5$ is an alkylene group of 1 to 10 carbon atoms, and preferably an alkyl group of 1 to 5 carbon atoms. Specific examples of $R^5$ include, of the groups mentioned as examples of $R^2$, those having from 1 to 10 carbon atoms. Of these, methylene, ethylene and trimethylene groups are preferred. Ethylene groups are more preferred.

In formula (1), "p" is a number which satisfies $0 \leq p \leq 10$, preferably satisfies $0 \leq p \leq 5$, and more preferably is 0 or 1; "a" is a number which satisfies the condition $1 \leq a \leq 3$, and is preferably 1 or 2.

The bonding positions of the groups of above general formula (1) in the organopolysiloxane molecule of component (A) may be terminal positions on the molecular chain (at one end or both ends), non-terminal positions on the molecular chain (i.e., positions located partway along the molecular chain or on side chains of the molecular chain), or may be both, although the presence of these groups only at terminal positions (at one or both ends, preferably at both ends) is desirable from the standpoint of the flexibility of the resulting cured product.

In the organopolysiloxane molecule of component (A), organic groups bonded to silicon atoms other than in the groups of above general formula (1) are exemplified by the same groups as $R^1$ above. In particular, monovalent hydrocarbon groups of 1 to 12 carbon atoms, especially 1 to 10 carbon atoms, other than aliphatic unsaturated groups are preferred.

Specific examples include groups like those mentioned above as examples of $R^1$. However, from the standpoint of ease of synthesis, an alkyl, aryl or halogenated alkyl group is preferred, with a methyl, phenyl or trifluoropropyl group being more preferred.

The molecular structure of component (A) is basically a linear or branched chain-like structure (including linear structures in which a portion of the backbone has branches) wherein the backbone is made up of repeating diorganosiloxane units. A linear diorganopolysiloxane in which both ends of the molecular chain are capped with groups of general formula (1) above is preferred.

Component (A) may be a single polymer having these molecular structures, a copolymer made up of these molecular structures, or a mixture of two or more of these polymers.

The organopolysiloxane of component (A) has a viscosity at 25° C. which, from the standpoint of the viscosity of the composition and to further enhance the mechanical properties of the cured product, is preferably from 10 to 10,000 mPa·s, and more preferably from 50 to 5,000 mPa·s. This viscosity range is generally, in the case of a linear organopolysiloxane, one that corresponds to a number-average degree of polymerization of from about 10 to about 550, and preferably from about 50 to about 450.

In this invention, the viscosity can be measured with a rotational viscometer, such as a BL, BH, BS or cone/plate-type viscometer or a rheometer (the same applies below).

The degree of polymerization (or the molecular weight) can be determined as the polystyrene-equivalent number-average degree of polymerization (or number-average molecular weight) in gel permeation chromatography (GPC) using toluene or the like as the developing solvent (the same applies below).

Specific examples of the organopolysiloxane of component (A) include, but are not limited to, those of formulas (3) to (5) below.

[Chem. 5]

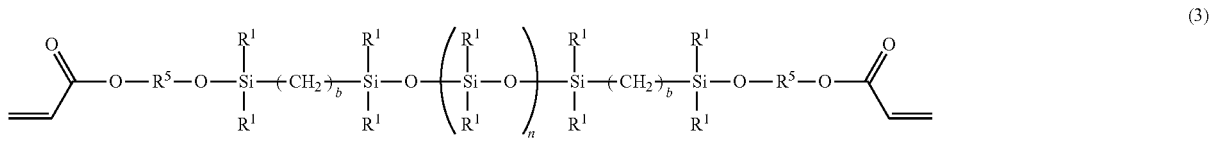

(3)

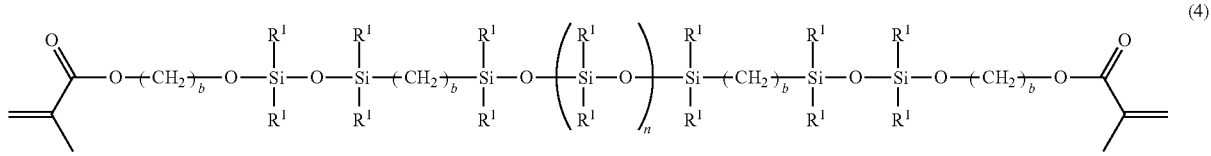

(4)

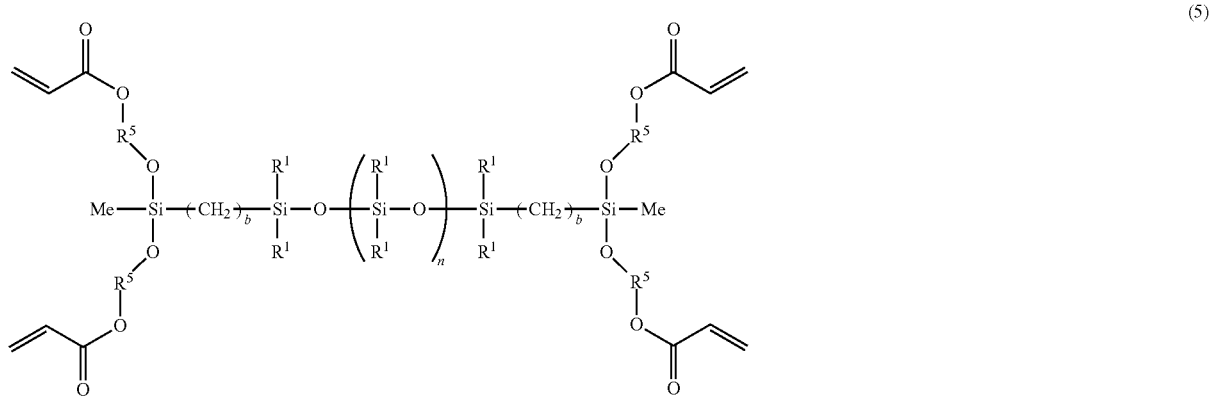

(5)

(wherein $R^1$, $R^5$ and "b" are as defined above, Me represents a methyl group, and "n" is a number that sets the viscosity of the organopolysiloxane to the above-indicated value, preferably from 1 to 800, and more preferably from 50 to 600).

Such organopolysiloxanes may be prepared by a known method. For example, the polysiloxane of above formula (3) can be obtained by reacting 2-hydroxyethyl acrylate with the product of a hydrosilylation reaction between a dimethylsiloxane/diphenylsiloxane copolymer capped at both ends with dimethylvinylsiloxy groups and chlorodimethylsilane.

The organopolysiloxane of formula (4) can be obtained as, for example, the product of a hydrosilylation reaction between a dimethylsiloxane/diphenylsiloxane copolymer capped at both ends with dimethylvinylsiloxy groups and 3-(1,1,3,3-tetramethyldisiloxanyl)propyl methacrylate (CAS No. 96474-12-3).

The organopolysiloxane of formula (5) above can be obtained by, for example, reacting 2-hydroxyethyl acrylate with the product of a hydrosilylation reaction between a dimethylsiloxane/diphenylsiloxane copolymer capped at both ends with dimethylvinylsiloxy groups and dichloromethylsilane.

(B) Organopolysiloxane Resin

Component (B) is one of the crosslinking ingredients in this composition. It is a (meth)acryloyloxy-containing group-containing organopolysiloxane resin containing (a) units of formula (2) below ($M^4$ units), (b) $R^4_3SiO_{1/2}$ units (M units) and (c) $SiO_{4/2}$ units (Q units).

[Chem. 6]

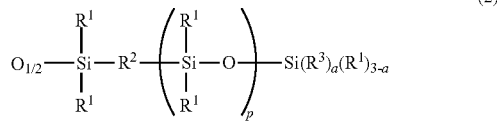

(2)

In formula (2) of the (a) units, $R^1$, $R^2$, $R^3$, "a" and "p" are as defined above.

Each $R^4$ in the (b) units is independently a substituted or unsubstituted monovalent hydrocarbon group of 1 to 10 carbon atoms. Specific examples include, of the groups mentioned above as examples of $R^1$, those having from 1 to 10 carbon atoms, among which the following are preferred: alkyl groups of 1 to 8 carbon atoms, preferably 2 to 6 carbon atoms, such as methyl, ethyl, n-propyl and n-butyl groups; aryl groups of 6 to 10 carbon atoms such as phenyl and tolyl groups; aralkyl groups of 7 to 10 carbon atoms such as benzyl group; and alkenyl groups of 2 to 6 carbon atoms such as vinyl, allyl and butenyl groups.

Moreover, as with the $R^1$ groups, some or all of the hydrogen atoms bonded to carbon atoms on the monovalent hydrocarbon groups represented by $R^4$ above may be replaced with the other substituents mentioned above.

In component (B) of the invention, the molar ratio of the sum of (a) units of above formula (2) ($M^4$ units) and (b) $R^4_3SiO_{1/2}$ units (M units) to (c) $SiO_{4/2}$ units (Q units), expressed as $M^4$ units+M units:Q units, is from 0.6:1 to 1.2:1. When the molar ratio $M^4$ units+M units:Q units is less than 0.6, the viscosity of the composition becomes very high; when it exceeds 1.2, the rubber properties of the cured product decrease.

In order to set the viscosity of the composition and the rubber properties of the cured product in more suitable ranges, the molar ratio $M^4$ units+M units:Q units is preferably from 0.7:1 to 1.2:1.

The rubber properties of the cured product can be adjusted by means of the molar ratio of $M^4$ units and M units. When there are too many $M^4$ units, the flexibility of the material may be lost; when there are too few $M^4$ units, the strength of the material may decrease. Therefore, taking these facts into account, it is preferable for the molar ratio $M^4$ units:M units to be from 0.025:1 to 0.25:1.

The $M^4$ unit content with respect to all the siloxane units in the organopolysiloxane resin serving as component (B) is preferably from 3 to 30 mol %, and more preferably from 5 to 25 wt %. Within such a range, the mechanical properties of the cured product are good.

Component (B) may include trifunctional siloxane units of the formula $R^1SiO_{3/2}$ (wherein $R^1$ is as defined above: these being organosilsesquioxane units) as constituent units. In this case, the combined amount of $R^1SiO_{3/2}$ units and $SiO_{4/2}$ units included is preferably from 10 to 90 mol %, and more preferably from 20 to 80 mol %, of all the siloxane units in the organopolysiloxane resin serving as component (B).

Component (B) has a number-average molecular weight of preferably from 500 to 30,000, and more preferably from 1,000 to 20,000. Within this range, the composition has a good workability. The number-average molecular weight is a polystyrene-equivalent value determined by gel permeation chromatography (GPC).

The amount of component (B) added per 100 parts by weight of component (A) is from 5 to 200 parts by weight, and preferably from 10 to 100 parts by weight. At less than 5 parts by weight, the mechanical properties of the cured product become low; at more than 200 parts by weight, the viscosity becomes very high.

Component (B) may be of a one type used alone or two or more may be used together.

(C) Photopolymerization Initiator

Specific examples of photopolymerization initiators that may be used in the invention include 2,2-diethoxyacetophenone, 2,2-dimethoxy-1,2-diphenylethan-1-one (Omnirad 651), 1-hydroxycyclohexyl-phenyl ketone (Omnirad 184), 2-hydroxy-2-methyl-1-phenylpropan-1-one (Omnirad 1173), 2-hydroxy-1-{4-[4-(2-hydroxy-2-methylpropionyl)benzyl]phenyl}-2-methylpropan-1-one (Omnirad 127), phenylglyoxylic acid methyl ester (Omnirad MBF), 2-methyl-1-[4-(methylthio)phenyl]-2-morpholinopropan-1-one (Omnirad 907), 2-benzyl-2dimethylamino-1-(4-morpholinophenyl-1-butanone (Omnirad 369), bis(2,4,6-trimethylbenzoyl)phenylphosphine oxide (Omnirad 819) and 2,4,6-trimethylbenzoyl-diphenyl phosphine oxide (Omnirad TPO) (all of the above being from IGM Resins B.V.). These may be used singly, or two or more may be used in combination.

Of the above, from the standpoint of compatibility with components (A) and (B), 2,2-diethoxyacetophenone, 2-hydroxy-2-methyl-1-phenylpropan-1-one (Omnirad 1173), bis(2,4,6-trimethylbenzoyl)phenylphosphine oxide (Omnirad 819) and 2,4,6-trimethylbenzoyl-diphenyl phosphine oxide (Omnirad TPO H) are preferred.

The photopolymerization initiator is added in an amount of from 0.01 to 20 parts by weight, preferably from 0.1 to 10 parts by weight, per 100 parts by weight of component (A).

At less than 0.01 part by weight, the curability of the composition is inadequate; at more than 20 parts by weight, the deep curability worsens.

(D) Organic Peroxide

Component (D) is an organic peroxide which is added for the purpose of, after the composition has been cured with ultraviolet light, effecting radical reactions by heating acryl groups or methacryl groups that have not fully reacted.

Organic peroxides that may be used in the invention are not particularly limited, provided that they generate radicals under heating, and are exemplified by ketone peroxides, hydroperoxides, diacyl peroxides, dialkyl peroxides, peroxyketals, alkyl peresters and percarbonates.

Specific examples include, from NOF Corporation: ketone peroxides such as Perhexa H, hydroperoxides such as Perbutyl H-69, diacylperoxides such as Nyper BW, dialkyl peroxides such as Percumyl D, Perbutyl C, Perbutyl D and Perbutyl O, peroxyketals such as Perhexa TMH, peroxyesters such as Perbutyl Z and Perbutyl L, and peroxydicarbonates such as Peroyl TCP; diisobutyryl peroxide, cumyl peroxyneodecanoate, di-n-propyl peroxydicarbonate, diisopropyl peroxydicarbonate, di-sec-butyl peroxydicarbonate, 1,1,3,3-tetramethylbutyl peroxyneodecanoate, di(4-t-butylcyclohexyl) peroxydicarbonate, di(2-ethylhexyl) peroxydicarbonate, t-hexyl peroxyneodecanoate, t-butyl peroxyneodecanoate, t-butyl peroxyneoheptanoate, t-hexyl peroxypivalate, t-butyl peroxypivalate, di(3,5,5-trimethylhexanoyl) peroxide, dilauroyl peroxide, 1,1,3,3-tetramethylbutyl peroxy-2-ethylhexanoate, disuccinic acid peroxide, 2,5-dimethyl-2,5-di(2-ethylhexanoylperoxy)hexane, t-hexyl peroxy-2-ethyl hexanoate, di(4-methylbenzoyl) peroxide, t-butyl peroxy-2-ethyl hexanoate, di(3-methylbenzoyl) peroxide, benzoyl (3-methylbenzoyl) peroxide, dibenzoyl peroxide, 1,1-di(t-butylperoxy)-2-methylcyclohexane, 1,1-di(t-hexylperoxy)-3,3,5-trimethylcyclohexane, 1,1-di(t-hexylperoxy)cyclohexane, 1,1-di(t-butylperoxy)cyclohexane, 2,2-di[4,4-di-(t-butylperoxy)cyclohexyl]propane, t-hexyl peroxyisopropyl monocarbonate, t-butyl peroxymaleic acid, t-butyl peroxy-3,5,5-trimethylhexanoate, t-butyl peroxylaurate, t-butyl peroxyisopropyl monocarbonate, t-butyl peroxy-2-ethylhexyl monocarbonate, t-hexyl peroxy benzoate, 2,5-dimethyl-2,5-di(benzoylperoxy)hexane, t-butyl peroxyacetate, 2,2-di(t-butylperoxy)butane, t-butyl peroxy benzoate, n-butyl-4,4-di-t-butylperoxyvalerate, di(2-t-butylperoxyisopropyl)benzene, dicumyl peroxide, di-t-hexyl peroxide, 2,5-dimethyl-2,5-di(t-butylperoxy)hexane, t-butyl cumyl peroxide, di-t-butyl peroxide, p-methane hydroperoxide, 2,5-dimethyl-2,5-di(t-butylperoxy)hexane-3-yne, diisopropylbenzene hydroperoxide, 1,1,3,3-tetramethylbutyl hydroperoxide, cumene hydroperoxide, t-butyl hydroperoxide, 2,4-dichlorobenzoyl peroxide, o-chlorobenzoyl peroxide, p-chlorobenzoyl peroxide, tris(t-butylperoxy) triazine, 2,4,4-trimethylpentyl peroxyneodecanoate, α-cumyl peroxyneodecanoate, t-amyl peroxy-2-ethylhexanoate, t-butyl peroxyisobutyrate, di-t-butyl peroxyhexahydroterephthalate, di-t-butyl peroxytrimethyladipate, di-3-methoxybutyl peroxydicarbonate, diisopropyl peroxy dicarbonate, t-butyl peroxyisopropylcarbonate, 1,6-bis(t-butylperoxycarbonyloxy)hexane, diethylene glycol bis (t-butylperoxycarbonate) and t-hexyl peroxyneodecanoate: and the following from Kayaku Akzo Corporation: Trigonox 36-C75, Laurox, Perkadox L-W75, Perkadox CH-50L, Trigonox TMBH, Kayacumene H, Kayabutyl H-70, Perkadox BC-FF, Kayahexa AD, Perkadox 14, Kayabutyl C, Kayabutyl D, Perkadox 12-XL25, Trigonox 22-N70 (22-70E), Trigonox D-T50, Trigonox 423-C70, Kayaester CND-C70, Trigonox 23-C70, Trigonox 257-C70, Kayaester P-70, Kayaester TMPO-70, Trigonox 121, Kayaester O, Kayaester HTP-65W, Kayaester AN, Trigonox 42, Trigonox F-C50, Kayabutyl B, Kayacarbon EH, Kayacarbon I-20, Kayacarbon BIC-75, Trigonox 117 and Kayalene 6-70. These may be used singly, or two or more may be used in combination.

Taking in consideration the temperature at which the UV-curable silicone composition is to be heat cured and the shelf stability of the composition, the 10-hour half-life temperature of these organic peroxides in benzene is preferably at least 40° C., more preferably at least 50° C., and even more preferably at least 60° C. If the 10-hour half-life temperature is too low, it may be difficult to fully ensure the shelf stability of the composition. The 10-hour half-life temperature has no particular upper limit, but is generally not more than 200° C.

In light of the above, 2,5-dimethyl-2,5-di(2-ethylhexanoylperoxy)hexane (available from Kayaku Nouryon Corporation under the trade name Kayalene 6-70), 1,6-bis (t-butylperoxycarbonyloxy)hexane (available from NOF Corporation under the trade name Perhexa 250) and t-butyl peroxyoctoate (available from Kayaku Akzo Corporation under the trade name Kayaester 0) are more preferred.

Component (D) is added in an amount per 100 parts by weight of component (A) which is from 0.1 to 20 parts by weight, preferably from 0.5 to 10 parts by weight, and more preferably from 1 to 5 parts by weight. At less than 0.1 part by weight, the curability is inadequate; at more than 20 parts by weight, the curing shrinkage ends up being too large.

(E) Ultraviolet Absorber Which Absorbs Light at Wavelengths Between 360 and 410 nm An ultraviolet absorber which absorbs light at wavelengths between 360 and 410 nm may be added to the inventive composition for the purpose of adjusting the curability when carrying out stereolithography with a 3D printer.

Specific examples of ultraviolet absorbers that may be used in the invention include 2-(2H-benzotriazol-2-yl)-6-dodecyl-4-methylphenol (Tinuvin 571, from BASF), 3-(2H-benzotriazol-2-yl)-5-(1,1-dimethylethyl)-4-hydroxy-$C_{7-9}$ branched and linear alkyl esters of benzenepropanoic acid (Tinuvin 384-2, from BASF), 2-(5-chloro-2-benzotriazolyl)-6-tert-butyl-p-cresol (Tinuvin 326, from BASF), the reaction product of 2-(4,6-bis(2,4-dimethylphenyl)-1,3,5-triazin-2-yl)-5-hydroxyphenyl with [($C_{10-16}$, primarily $C_{12-13}$, alkyloxy)methyl]oxirane (Tinuvin 400, from BASF), thioxanthone, 2-isopropylthioxanthone, 2,4-diethylthioxanthone, benzophenone, camphorquinone, 1-phenyl-1,2-propanedione, diethylamino hydroxybenzoyl hexyl benzoate (Uvinul A Plus, from BASF), 1-(4-tert-butylphenyl)-3-(4-methoxyphenyl)-1,3-propanedione and 2-ethylhexyl 4-methoxycinnamate. These may be used singly, or two or more may be used in combination.

When an ultraviolet absorber is used, the amount of addition per 100 parts by weight of component (A) is preferably from 0.01 to 20 parts by weight, and more preferably from 0.1 to 10 parts by weight. At less than 0.01 part by weight, the effects of the ultraviolet absorber may not fully appear; at more than 20 parts by weight, the deep curability may worsen.

(F) Colorant

Various colorants may be added to the inventive composition for such purposes as to adjust the curability of the composition and to colorize the composition.

Colorants that may be used include common pigments (e.g., iron oxide, titanium oxide, zinc oxide), dyes, and carbon black. These may be used singly, or two or more may be used in combination.

When a colorant is used, the amount added per 100 parts by weight of component (A) is preferably in the range of 0.01 to 20 parts by weight. At less than 0.01 part by weight, the effects of the colorant may not fully appear; at more than 20 parts by weight, the deep curability may worsen.

In addition, additives such as silane coupling agents, tackifiers, polymerization inhibitors, antioxidants, ultraviolet absorbers that are light-resistant stabilizers, and light stabilizers may be included in the inventive composition within ranges that do not detract from the advantageous effects of the invention.

Also, the inventive composition may be suitably mixed with another resin composition and used.

The ultraviolet-curable silicone composition for stereolithography of the invention can be obtained by mixing together in any order above components (A) to (D) and, if necessary, other ingredients, stirring and the like. The apparatus used for operations such as stirring is not particularly limited. For example, an automated mortar, three-roll mill, ball mill, planetary mill or the like may be used. These apparatuses may also be suitably combined.

From the standpoint of the ability to stereolithographically fabricating objects, the ultraviolet-curable silicone composition for stereolithography of the invention has a viscosity at 23° C. which is preferably not more than 10,000 mPa·s, and more preferably not more than 8,000 mPa·s. At a viscosity above 10,000 mPa·s, the fabricating ability may markedly worsen and it may be impossible to accurately obtain the fabricated object that is desired. Although there is no particular lower limit, the viscosity is preferably at least 100 mPa·s, and more preferably at least 500 mPa·s.

The ultraviolet-curable silicone composition for stereolithography of the invention rapidly cures under ultraviolet irradiation.

Exemplary sources of the ultraviolet light that is irradiated in this case include UV LED lamps, high-pressure mercury-vapor lamps, ultrahigh-pressure mercury-vapor lamps, metal halide lamps, carbon arc lamps and xenon lamps.

In cases where curing is effect solely by ultraviolet irradiation, the amount of ultraviolet irradiation (cumulative exposure dose) with respect to, for example, a sheet of the inventive composition that has been formed to a thickness of about 2.0 mm, is preferably from 1 to 10,000 mJ/cm$^2$, and more preferably from 10 to 6,000 mJ/cm$^2$. That is, when ultraviolet light at an illuminance of 100 mW/cm$^2$ is used, the ultraviolet light should be irradiated for a period of from about 0.01 second to about 100 seconds.

Alternatively, a cured product having excellent rubber properties can be obtained from the inventive composition by irradiating the composition with a small amount of ultraviolet light and then carrying out heating.

The small amount of ultraviolet light is preferably from 1 to 200 mJ/cm$^2$, and more preferably from 10 to 150 mJ/cm$^2$, with respect to a sheet of the inventive composition that has been formed to a thickness of about 2.0 mm. That is, when ultraviolet light having an illuminance of 10 mW/cm$^2$ is used, the ultraviolet light should be irradiated for a period of from about 0.1 seconds to about 20 seconds.

The heating temperature is preferably between 50° C. and 200° C., and more preferably between 100° C. and 150° C., and the heating time is preferably from 0.5 to 24 hours, and more preferably from 1 to 2 hours.

For a cured product composed of the inventive ultraviolet-curable silicone composition for stereolithography to exhibit excellent rubber properties, the tensile strength is preferably at least 3.0 MPa, and more preferably at least 4.0 MPa. Also, the elongation at break is preferably at least 80%, and more preferably at least 90%. These values are measured values obtained in accordance with JIS-K6249.

EXAMPLES

Examples and Comparative Examples are given below to more concretely illustrate the invention, although the invention is not limited by these Examples.

The compounds serving as the ingredients used in the Examples were as follows. Here, "Me" stands for a methyl group. "Ph" stands for a phenyl group and "Vi" stands for a vinyl group.

Component (A)

[Chem. 7]

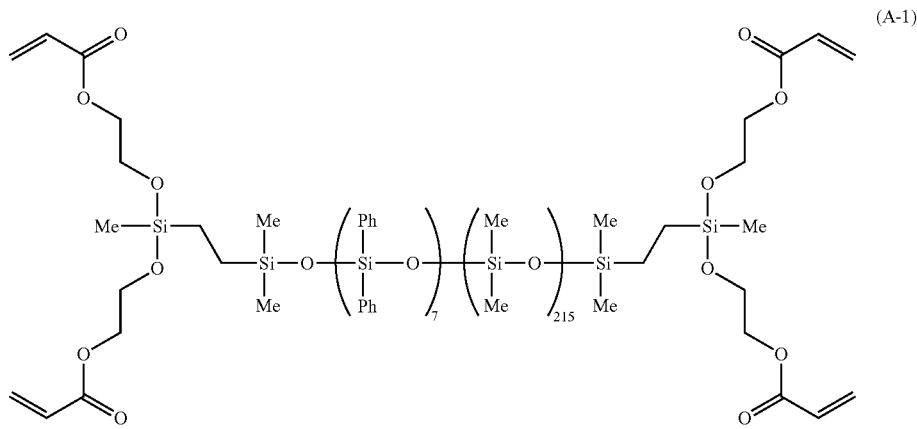

(A-1)

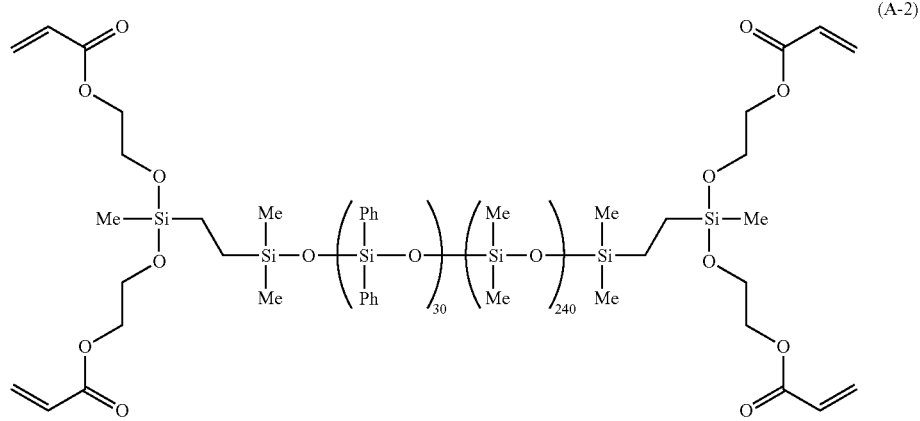

(wherein the siloxane units within parentheses may be arranged in any order).

Component (B)

(B-1) 50 wt % xylene solution of organopolysiloxane resin (number-average molecular weight, 5,700) containing the methacryloyloxy group-containing unit shown below, $ViMe_2SiO_{1/2}$ units, $Me_3SiO_{1/2}$ units and $SiO_2$ units in a molar ratio, expressed as methacryloyloxy group-containing units/($ViMe_2SiO_{1/2}$ units)/($Me_3SiO_{1/2}$ units)/($SiO_2$ units), of 0.10/0.07/0.67/1.00

(B-2) 50 wt % xylene solution of organopolysiloxane resin (number-average molecular weight, 6,200) containing the methacryloyloxy group-containing unit shown below, $ViMe_2SiO_{1/2}$ units, $Me_3SiO_{1/2}$ units and $SiO_2$ units in a molar ratio, expressed as methacryloyloxy group-containing units/($ViMe_2SiO_{1/2}$ units)/($Me_3SiO_{1/2}$ units)/($SiO_2$ units), of 0.14/0.03/0.67/1.00

[Chem. 8]

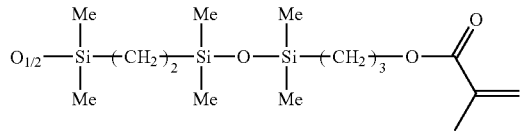

Component (C)

(C-1) 2-Hydroxy-2-methyl-1-phenylpropan-1-one (Omnirad 1173, from IGM Resins B.V.)
(C-2) 2,4,6-Trimethylbenzoyl-diphenyl phosphine oxide (Omnirad TPO H, from IGM Resins B.V.)

Component (D)

(D-1) Tributyl citrate acetate solution of 1,6-bis(tert-butylperoxycarbonyloxy)hexane (active ingredient, 70 wt %) (available from Kayaku Nouryon Corporation under the trade name Kayalene 6-70; 10-hour half-life temperature in benzene, 97° C.)
(D-2) Hydrocarbon solution of 2,5-dimethyl-2,5-di(2-ethylhexanoylperoxy)hexane (active ingredient, 50 wt %) (available from NOF Corporation under the trade name Perhexa 250; 10-hour half-life temperature in benzene, 66° C.)

Component (E)

(E-1) 2-(2H-benzotriazol-2-yl)-6-dodecyl-4-methylphenol (Tinuvin 571, from BASF)

Examples 1 to 4 and Comparative Examples 1 and 2

The respective silicone compositions shown in Table 1 were prepared by mixing together Components (A) to (E) in the proportions shown in Table 1, and then distilling off the xylene at 100° C. under reduced pressure. The viscosities of the compositions in Table 1 are values measured at 23° C. using a rotational viscometer.

In each case, the silicone composition thus prepared was formed into a sheet, cured under a nitrogen atmosphere and at room temperature (25° C.) by irradiation with 405 nm wavelength ultraviolet light to an exposure dose of 150 mJ/cm² using a UV curing system from CCS Inc., and then heated for 1 hour at 120° C. The thickness of the sheet was set to 2.0 mm. The hardness, elongation at break and tensile strength of the cured product were measured in accordance with JIS-K6249.

TABLE 1

| | | Example | | | | Comparative Example | |
|---|---|---|---|---|---|---|---|
| | | 1 | 2 | 3 | 4 | 1 | 2 |
| Formulation (pbw) | A-1 | 100 | 100 | 100 | 0 | 100 | 0 |
| | A-2 | 0 | 0 | 0 | 100 | 0 | 100 |
| | B-1 | 0 | 0 | 0 | 130 | 0 | 130 |
| | B-2 | 85 | 85 | 85 | 0 | 85 | 0 |
| | C-1 | 1 | 1 | 1 | 1 | 1 | 1 |
| | C-2 | 1 | 1 | 1 | 1 | 1 | 1 |
| | D-1 | 3 | 3 | 0 | 3 | 0 | 0 |
| | D-2 | 0 | 0 | 4 | 0 | 0 | 0 |
| | E-1 | 0 | 1 | 0 | 0 | 0 | 0 |
| Properties of composition | Viscosity (mPa·s) | 1,390 | 1,360 | 1,320 | 5,010 | 1,440 | 5,150 |

TABLE 1-continued

| | | Example | | | | Comparative Example | |
|---|---|---|---|---|---|---|---|
| | | 1 | 2 | 3 | 4 | 1 | 2 |
| Properties of cured product | Hardness (Type A) | 48 | 49 | 47 | 47 | 47 | 32 |
| | Tensile strength (MPa) | 6.4 | 6.3 | 6.2 | 4.3 | 2.8 | 0.7 |
| | Elongation at break (%) | 100 | 90 | 90 | 110 | 73 | 60 |

As shown in Table 1, the ultraviolet-curable silicone compositions prepared in Examples 1 to 4 had viscosities suitable for use in stereolithography. In addition, even when the ultraviolet exposure dose was low, the resulting cured products had good mechanical properties.

On the other hand, in the compositions in Comparative Examples 1 and 2 that do not include an organic peroxide, at a low ultraviolet exposure dose, the cured products had a low tensile strength and elongation at break and thus were brittle materials.

The invention claimed is:

1. An ultraviolet-curable silicone composition for stereolithography, comprising:
   (A) 100 parts by weight of a linear diorganopolysiloxane, each end of which is capped with a group of formula (1) below per molecule

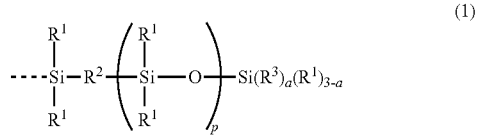

wherein each $R^1$ is independently a substituted or unsubstituted monovalent hydrocarbon group of 1 to 20 carbon atoms, $R^2$ is an oxygen atom or an alkylene group of 1 to 20 carbon atoms, each $R^3$ is independently an acryloyloxyalkyl group, methacryloyloxyalkyl group, acryloyloxyalkyloxy group or methacryloyloxyalkyloxy group, p is a number that satisfies $0 \leq p \leq 10$, the letter 'a' is a number that satisfies $1 \leq a \leq 3$, and the dashed line represents an available bond;
   (B) from 5 to 200 parts by weight of an organopolysiloxane resin comprising (a) units of formula (2) below

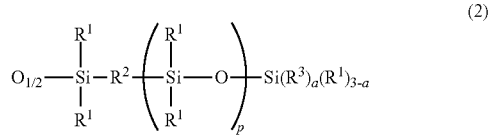

wherein $R^1$, $R^2$, $R^3$, a and p are as defined above,
   (b) $R^4{}_3SiO_{1/2}$ units, wherein each $R^4$ is independently a substituted or unsubstituted monovalent hydrocarbon group of 1 to 10 carbon atoms, and (c) $SiO_{4/2}$ units, the molar ratio of the sum of (a) units and (b) units to (c) units being from 0.6:1 to 1.2:1;
   (C) from 0.01 to 20 parts by weight of a photopolymerization initiator; and
   (D) from 0.1 to 20 parts by weight of an organic peroxide, wherein $R^4$ of units (b) in component (B) comprises a substituted or unsubstituted alkenyl group of 2 to 6 carbon atoms and further wherein the composition has a viscosity at 23° C. of not more than 10,000 mPa·s and is suitable for use in lithography.

2. The ultraviolet-curable silicone composition for stereolithography of claim 1 which has a viscosity at 23° C. of not more than 8,000 mPa·s.

3. The ultraviolet-curable silicone composition for stereolithography of claim 1, further comprising (E) from 0.01 to 20 parts by weight of an ultraviolet absorber which absorbs light having wavelengths between 360 and 410 nm per 100 parts by weight of component (A).

4. The ultraviolet-curable silicone composition for stereolithography of claim 1, further comprising (F) from 0.01 to 20 parts by weight of a colorant per 100 parts by weight of component (A).

5. A cured product of the ultraviolet-curable silicone composition for stereolithography of claim 1.

6. A method for producing the cured product of claim 5, comprising the steps of irradiating the ultraviolet-curable silicone composition for stereolithography with from 1 to 200 mJ/cm² of ultraviolet light, and then curing at between 50° C. and 200° C.

7. The ultraviolet-curable silicone composition for stereolithography of claim 1, wherein "a" in formula (1) is 2.

8. The ultraviolet-curable silicone composition for stereolithography of claim 1, wherein component (A) has the following formula (5):

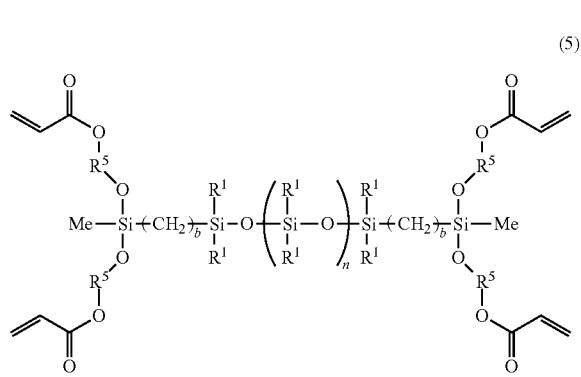

wherein $R^1$ is as defined above, $R^5$ is an alkylene group of 1 to 10 carbon atoms, Me represents a methyl group, and "b" is a number which satisfies $1 \leq b \leq 4$, "n" is a number that sets the viscosity of the organopolysiloxane to 10 to 10,000 mPa·s.

9. The ultraviolet-curable silicone composition for stereolithography of claim 1 which has a viscosity at 23° C. of at least 100 mPa·s and not more than 10,000 mPa·s.

10. The ultraviolet-curable silicone composition for stereolithography of claim 1 which has a viscosity at 23° C. of at least 500 mPa·s and not more than 10,000 mPa·s.

11. The ultraviolet-curable silicone composition for stereolithography of claim 2 which consists of said components (A), (B), (C) and (D), and optionally one or more of (E) from 0.01 to 20 parts by weight of an ultraviolet absorber which absorbs light having wavelengths between 360 and 410 nm per 100 parts by weight of component (A), (F) from 0.01 to 20 parts by weight of a colorant per 100 parts by weight of component (A), silane coupling agents, tackifiers, polymerization inhibitors, antioxidants, ultraviolet absorbers that are light-resistant stabilizers, light stabilizers and another resin.

* * * * *